United States Patent [19]

Sklar et al.

[11] Patent Number: 5,990,928
[45] Date of Patent: Nov. 23, 1999

[54] METHOD AND APPARATUS FOR RECEIVING BROADCAST ENTERTAINMENT TRANSMISSIONS AT A MOVING RECEIVER STATION

[75] Inventors: Richard E. Sklar; Ralph Phillipp, both of Huntington Beach; Robert U. Walzer, Yorba Linda; Mark R. Zimmerman, Ontario; Tracy L. Decuir, Cypress, all of Calif.

[73] Assignee: Rockwell International Corporation, Costa Mesa, Calif.

[21] Appl. No.: 08/865,816

[22] Filed: May 30, 1997

[51] Int. Cl.$^6$ ............................................. H04Q 7/06
[52] U.S. Cl. ..................... 348/8; 348/6; 348/460; 348/461; 455/12.1; 455/6.3; 455/6.1; 370/312; 342/359
[58] Field of Search .................... 455/12.1, 6.3, 455/6.1, 98, 13.1, 13.2; 348/8, 6, 460, 461, 117; 370/312; 342/359, 357.15

[56] References Cited

U.S. PATENT DOCUMENTS

| | | | |
|---|---|---|---|
| 4,706,198 | 11/1987 | Thurman | 364/439 |
| 4,866,524 | 9/1989 | Six | 358/183 |
| 5,760,819 | 6/1998 | Sklar et al. | 348/8 |
| 5,790,175 | 9/1998 | Sklar et al. | 348/8 |
| 5,790,198 | 8/1998 | Roop et al. | 348/460 |
| 5,801,751 | 9/1998 | Sklar et al. | 348/8 |

*Primary Examiner*—Dwayne D. Bost
*Assistant Examiner*—Alan T. Gantt
*Attorney, Agent, or Firm*—Kyle Eppele; James P. O'Shaughnessy

[57] ABSTRACT

The disclosure describes a moving receiver station capable of receiving broadcast entertainment signals from a first geostationary satellite associated with a first program provider, or from a second geostationary satellite associated with a second program provider. The receiver station is part of an aircraft and includes a tracking antenna and switching and control system that locks the tracking antenna on either the first or second satellite. The switching and control system receives position information, program attribute information and satellite coverage area information to determine when the aircraft is leaving one coverage area and entering another. The switching and control system switches the antenna to the second satellite when the aircraft enters the second coverage area, and limits the availability of received programming based on whether the aircraft is leaving the first coverage area or entering the second coverage area.

19 Claims, 3 Drawing Sheets

METHOD AND APPARATUS FOR RECEIVING BROADCAST ENTERTAINMENT TRANSMISSIONS AT A MOVING RECEIVER STATION

BACKGROUND OF THE INVENTION (a) Field of the Invention

The present invention relates generally to in-flight aircraft entertainment systems. More particularly it relates to a receiver station capable of receiving broadcast entertainment signals on-board an aircraft during flight, wherein the broadcast signals originate from a plurality of different program providers.

(b) Description of Related Art

Communications satellites generally orbit the earth at the same relative rate of speed as the earth's rotation. Satellites in such an orbit are referred to as geo-stationary. They appear to remain substantially fixed in relation to a specific point on earth, such as a ground-based satellite antenna/dish, thus enabling satellites to relay uninterrupted signals from one point on the earth's surface to another.

Although analog television communication satellites have been used for many years to relay television signals between remote locations, it was only recently that commercially viable direct-to-home broadcast satellite systems were developed for direct delivery of satellite broadcast television programming to viewers in their homes. One such direct-to-home satellite television broadcast system is the DSS® digital satellite television system utilized by the DIRECTV® broadcast service. At a satellite uplink facility, television programming signals are digitized, packetized, multiplexed with other digital signals, compressed (if required), mated with error correction codes, modulated on a carrier and uplinked to a geostationary satellite. The satellite receives the uplinked digital bitstream and rebroadcasts it over a footprint that preferably covers at least the continental United States. Receiver stations, which are typically ground-based, receive the digital bitstream of data packets from the satellite. The receiver stations include an antenna, which preferably is in the form of an 18-inch satellite dish. The antenna feeds the received digital bitstream to an integrated receiver/decoder (IRD) unit that recovers the transmitted bitstream and converts the television programming content of the bitstream to television programming signals capable of being displayed on a conventional NTSC television display device.

Aircrafts typically include some form of electronic distribution system for controlling and coordinating the distribution throughout the aircraft of electronic communications such as seat lighting commands, attendant call commands, audio announcements, and audio/video entertainment signals. In many recently developed systems, data communications such as video game software or menus of the available aircraft services may also be distributed.

A typical aircraft communication system includes a headend area, a signal distribution network, and a plurality of peripheral stations consisting primarily of passenger seat stations or terminals. In general, the headend is located at the front of the aircraft cabin, and provides, inter alia, a central location for the assembly of the entertainment related signals/services that are transmitted to passenger terminals via the aircraft's signal distribution system. If the communication signals relate to entertainment services, the aircraft communication system is often referred to as an in-flight entertainment (IFE) system.

A typical headend of an IFE system includes sources for video and related audio, audio unrelated to the video, and entertainment data such as game software and/or menu data. The audio source can include audio tape players (digital and analog), compact disk (CD) players, and other similar devices. The video source can include conventional video tape players (digital and analog), conventional video disk players, and other similar devices.

The data source can be a conventional hard or floppy disk storage medium and a conventional computer. The assignee of the present invention has developed an inflight entertainment system that incorporates a satellite signal receiver station. The in-flight receiver station receives television signals broadcast from a satellite, and the aircraft's signal distribution system distributes the received television programming to passengers. Various aspects of the above-referenced system are disclosed in several co-pending U.S. patent applications, including application Ser. No. 08/667,222, filed Jun. 19, 1996, entitled "Airborne Satellite Television System"; application Ser. No. 08/667,225, filed Jun. 19, 1996, entitled "Distribution Of A Large Number Of Live Television Programs To Individual Passengers In An Aircraft"; and application Ser. No.08/667,224, filed Jun. 19, 1996, entitled "Distribution Of Satellite Television Programs To Passengers In An Aircraft When It Is Out Of Range Of The Satellites". The entire disclosures of above-referenced co-pending patent applications are incorporated herein by reference, in their entirety.

Although the above-referenced patent applications describe advantageous systems, they are not designed for or intended to address the situation where there are several potential sources of broadcast signals in a given geographic area, or where the aircraft moves from the coverage area of one signal transmitter to the coverage area of a second different signal transmitter. Accordingly, there is a need for an in-flight aircraft entertainment system having a receiver station capable of receiving entertainment signals broadcast from several different program providers.

SUMMARY OF THE INVENTION

The present invention is embodied in a method and apparatus for receiving broadcast entertainment transmissions at a moving receiver station, wherein the broadcast can originate from several different program providers. Preferably, the moving receiver station is embodied in an in-flight aircraft entertainment system that incorporates a satellite receiver station and distribution system. The in-flight receiver station receives television signals broadcast from a satellite, and distributes the received television programming to passengers on the aircraft.

The disclosed in-flight broadcast programming distribution system embodying the present invention is a satellite-based distribution system that generally includes several satellite uplink facilities, each of which is operated by a particular direct broadcast satellite programming provider having its own compilation of programming choices and signal characteristics (for e.g., frequencies, polarizations, signal formats, etc.). Each programming provider's uplink facility compiles broadcast programs or channels into a broadband signal, modulates a carrier frequency band with the broadband signal, then transmits (uplinks) the modulated signals to a geosynchronous satellite. There may be a separate satellite for each program provider, or two program providers may share transponder (or, frequency) space on a single satellite. In either case, the satellite amplifies the received programming signals, shifts the signals to a different carrier frequency band and transmits (downlinks) the frequency shifted signals toward earth for reception at a moving receiver station. Preferably, the moving receiver station is embodied in an in-flight aircraft entertainment system that incorporates a satellite signal receiver station and signal distribution system. The in-flight receiver station receives television signals broadcast from the direct broadcast satellites, and distributes the received television programming to passengers on the aircraft.

Unlike ground-based RF communications, satellite transmissions are highly directional. Thus, in order to receive a satellite signal, the satellite antenna, which typically takes the form of a parabolic dish, must be pointed in the direction of the satellite. Accordingly, the above-referenced in-flight receiver station utilizes a tracking antenna (which may or may not be parabolic) and an associated switching/receiving/decoding (SRD) system to continually adjust the pointing direction of the antenna so that it always points in the direction of a target satellite even though the antenna is in motion due to the flight of the aircraft to which the antenna is attached. According to the present invention, the SRD system also incorporates means for selectively switching the tracking antenna from tracking a first satellite to tracking a second satellite, thereby switching the receiver station from receiving its signals from the program provider associated with the first satellite to the program provider associated with the second satellite. The SRD's switching means utilizes position information about the location and attitude of the aircraft to continuously adjust the pointing direction of the tracking antenna such that the antenna is always pointing in the direction of a first satellite. The SRD system also uses the aircraft's position information to determine when the aircraft is about the leave the coverage region of the first satellite. The above-referenced SRD system uses the information that the aircraft is about to leave the coverage area of the first satellite and enter the coverage area of a second satellite to control the tracking antenna and switch it from tracking the first satellite to tracking the second satellite.

The above-referenced SRD system of the in-flight receiver station further incorporates means for selectively controlling the timing of when and how programming is made available as the tracking antenna is about to switch from the first satellite to the second satellite. A conventional digital satellite television broadcast can include program guide data that is used by the individual receiver stations to build an on-screen program guide. The program guide includes a variety of information about the broadcast programming, including program titles, channels, time and length of broadcast, program ratings, program descriptions, category identifiers, and other information. The SRD system uses the program guide data to determine whether the various programs available on the various channels will finish before the aircraft moves from the first coverage region to the second coverage region. For the programs that will not have time to finish, the SRD system switches to a shorter program that will have time to finish, or to a program that can be interrupted (for e.g., a news program) without disturbing the passengers who might be viewing that channel.

When the aircraft leaves the coverage area of the first satellite and enters the coverage area of the second satellite, the SRD system switches the tracking antenna to track the second satellite source, then determines whether each of the programs available from the second satellite are in progress or are about to start. If a program is in progress, the SRD system switches to another program that can be started in progress, such as a news program.

Accordingly, the present invention may be embodied in a system for controlling the reception of broadcast entertainment transmissions at a moving receiver station, comprising: a tracking antenna for receiving broadcast entertainment transmissions from a first transmitter having a first coverage area; an antenna controller coupled to said tracking antenna for pointing said tracking antenna toward at least a first set of predetermined coordinates and a second set of predetermined coordinates and causing said tracking antenna to track said first set of predetermined coordinates or said second set of predetermined coordinates; a region controller coupled to said antenna controller and receiving position information related to the location of said moving receiver station; said region controller sending a first control signal to said antenna controller when said position information indicates that said moving receiver is within said first coverage area; and said region controller sending a second control signal to said antenna controller when said position information indicates that said moving receiver is within a second coverage area of a second transmitter.

In an alternative embodiment of the above-described system, the first control signal causes said antenna controller to switch from said first predetermined coordinates to said second predetermined coordinates; said first predetermined coordinates correspond to a location of the first transmitter; and said second predetermined coordinates correspond to a location of the second transmitter.

In yet another alternative of the above-described system, said tracking antenna forwards received broadcast entertainment transmissions to a signal processing unit for processing said broadcast entertainment transmissions; said broadcast entertainment transmissions including program attribute data; and said region controller coupled to said signal processing unit, receiving said program attribute data and using said position information and said program attribute data to determine what portions of said broadcast entertainment transmissions are available from said signal processing unit.

In one aspect of the above system, said program attributes include start times and lengths of programs included among said broadcast entertainment transmissions; and said region controller uses said position information and said program attribute data to determine: how long said moving receiver will take to travel from said first coverage area to said second coverage area; what programs will end before said moving receiver leaves said first coverage area; and what programs will not end before said moving receiver leaves said first coverage area.

In yet another aspect of the above system, said signal processing unit is coupled to a signal distribution system that transmits said broadcast entertainment transmissions to remote display terminals coupled to said signal distribution system; and said region controller causes the display in communication with said signal processing unit to display overlay messages related to said programs that will end before said moving receiver leaves said first coverage area, and overlay messages related to said programs that will not end before said moving receiver leaves said first coverage area.

The invention may also be embodied in a method of receiving broadcast entertainment transmissions on-board a moving aircraft, comprising the steps of, receiving position information about a location of said aircraft; receiving first program attribute data related to programs broadcast as part of said broadcast entertainment transmissions; using said position information to determine whether said aircraft is within a range of leaving a first coverage area associated with a first geostationary satellite broadcasting first entertainment transmissions from a first program provider; using said position information, said program attribute information and said determination of whether said aircraft is within a range of leaving a first coverage area to limit the availability of said first broadcast entertainment transmissions.

In one aspect of the above method, said program attributes include start times and lengths of programs included among said broadcast entertainment transmissions; and said position information and said program attribute data are used to determine: how long said aircraft will take to travel from said first coverage area to a second coverage area; what programs will end before said moving aircraft leaves said first coverage area; and what programs will not end before said moving aircraft leaves said first coverage area.

In still another aspect of the invention, the above method includes the steps of, providing said broadcast entertainment transmissions to remote display terminals; and causing the display to display overlay messages related to said programs that will end before said moving aircraft leaves said first coverage area, and overlay messages related to said programs that will not end before said moving aircraft leaves said first coverage area.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
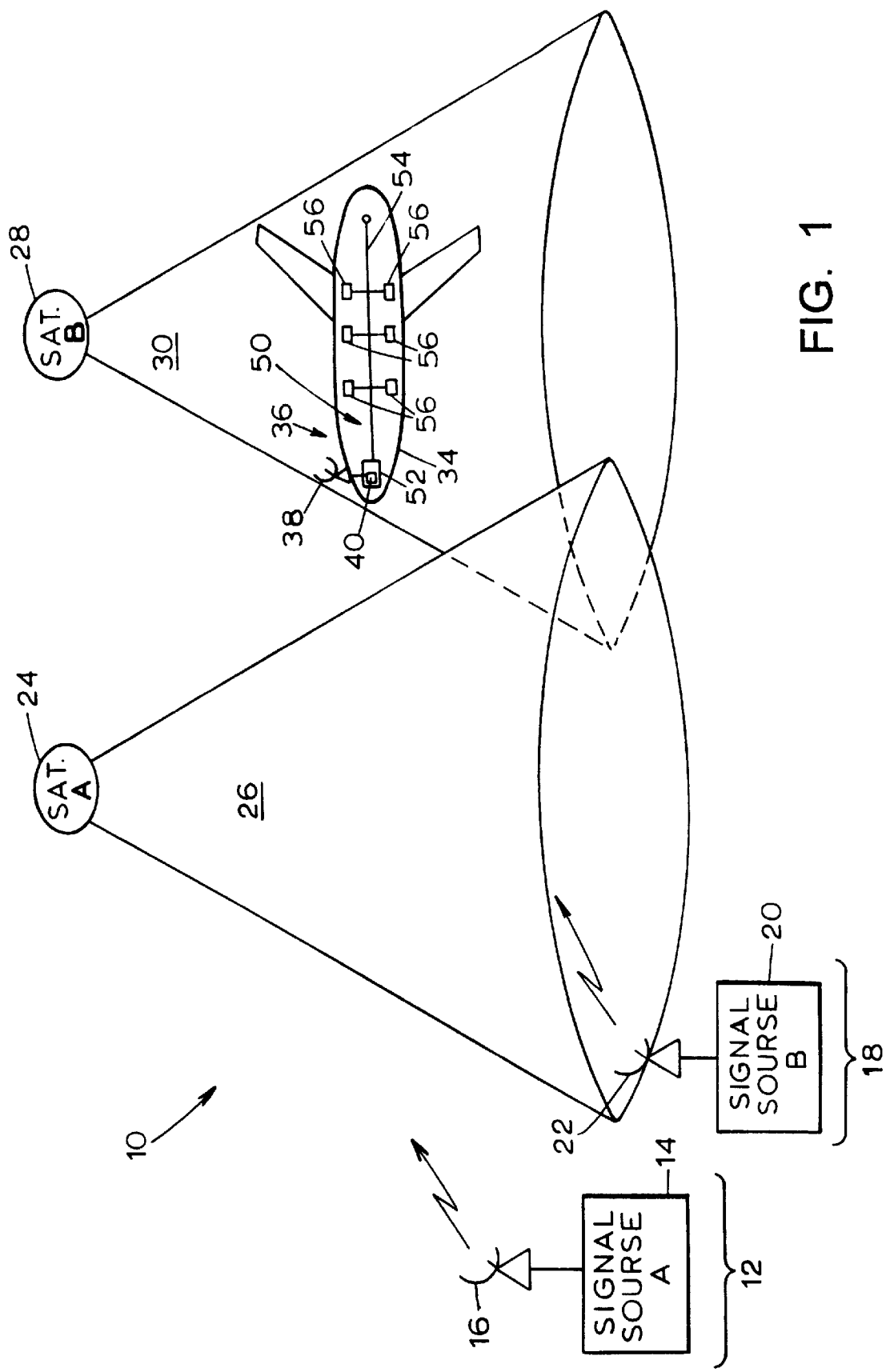
FIG. 1 is a diagram of an aircraft-based direct broadcast transmission and reception system capable of utilizing the present invention.

The in-flight broadcast programming distribution system of the present invention is a satellite-based distribution system that generally includes several satellite uplink facilities, each of which is operated by a particular direct broadcast satellite program provider having its own compilation of programming choices and signal characteristics (for e.g., frequencies, polarizations, signal formats, etc.). Each program provider's uplink facility compiles a number of broadcast programs or channels into a broadband signal, modulates a carrier frequency band with the broadband signal, then transmits (uplinks) the modulated signal to a geosynchronous satellite. There may be a separate satellite for each program provider, or two program providers may share transponder (or, frequency) space on a single satellite. In either case, the satellite amplifies the received programming signals, shifts the signals to a different carrier frequency band and transmits (downlinks) the frequency shifted signals toward earth for reception at a moving receiver station. Preferably, the moving receiver station is embodied in an in-flight aircraft entertainment system that incorporates a satellite signal receiver station and signal distribution system. The in-flight receiver station receives television signals broadcast from the direct broadcast satellites, and distributes the received television programming to passengers on the aircraft.

Unlike ground-based RF communications, satellite transmissions are highly directional. Thus, in order to receive a satellite signal, the satellite antenna, which typically takes the form of a parabolic dish, must be pointed in the direction of the satellite. Accordingly, the above-referenced in-flight receiver station utilizes a tracking antenna and an associated controller to continually adjust the pointing direction of the antenna so that it always points in the direction of a target satellite even though the antenna is in motion due to the flight of the aircraft to which the antenna is attached. According to the present invention, the controller also incorporates means for selectively switching the tracking antenna from tracking a first satellite to tracking a second satellite, thereby switching the receiver station from receiving its signals from the program provider associated with the first satellite to the program provider associated with the second satellite. The controller's switching means utilizes position information about the location of the aircraft to continuously adjust the pointing direction of the tracking antenna such that the antenna is always pointing in the direction of a first satellite. The controller/switching means also uses the aircraft position information to determine when the aircraft is about the leave the coverage region of the first satellite. The above-referenced means for switching uses the information that the aircraft is about to leave the coverage area of the first satellite and enter the coverage area of a second satellite to control the tracking antenna and switch it from tracking the first satellite to tracking the second satellite.

The above-referenced in-flight receiver station further incorporates means for selectively controlling the timing of when and how programming is provided when the tracking antenna is about to switch from the first satellite to the second satellite. A conventional digital satellite television broadcast can include program guide data that is used by the individual receiver stations to build an on-screen program guide. The program guide includes a variety of information about the broadcast programming, including program titles, channels, time and length of broadcast, program ratings, program descriptions, category identifiers, and other information. The receiver station uses the program guide data to determine whether the various programs available on the various channels will finish before the aircraft moves from the first signal source region to the second signal source region. For the programs that will not have time to finish, the receiver switches to a shorter program that will have time to finish, or to a program that can be interrupted (for e.g., a news program) without disturbing the passengers who might be viewing that channel.

When the aircraft leaves the coverage area of the first satellite and enters the coverage area of the second satellite, the receiver switches the antenna tracking system to track the second satellite, then determines whether each of the programs available from the second satellite are in progress or are about to start. If a program is in progress, the receiver switches to another program that can be started in progress, such as a news program.

Figure 2:
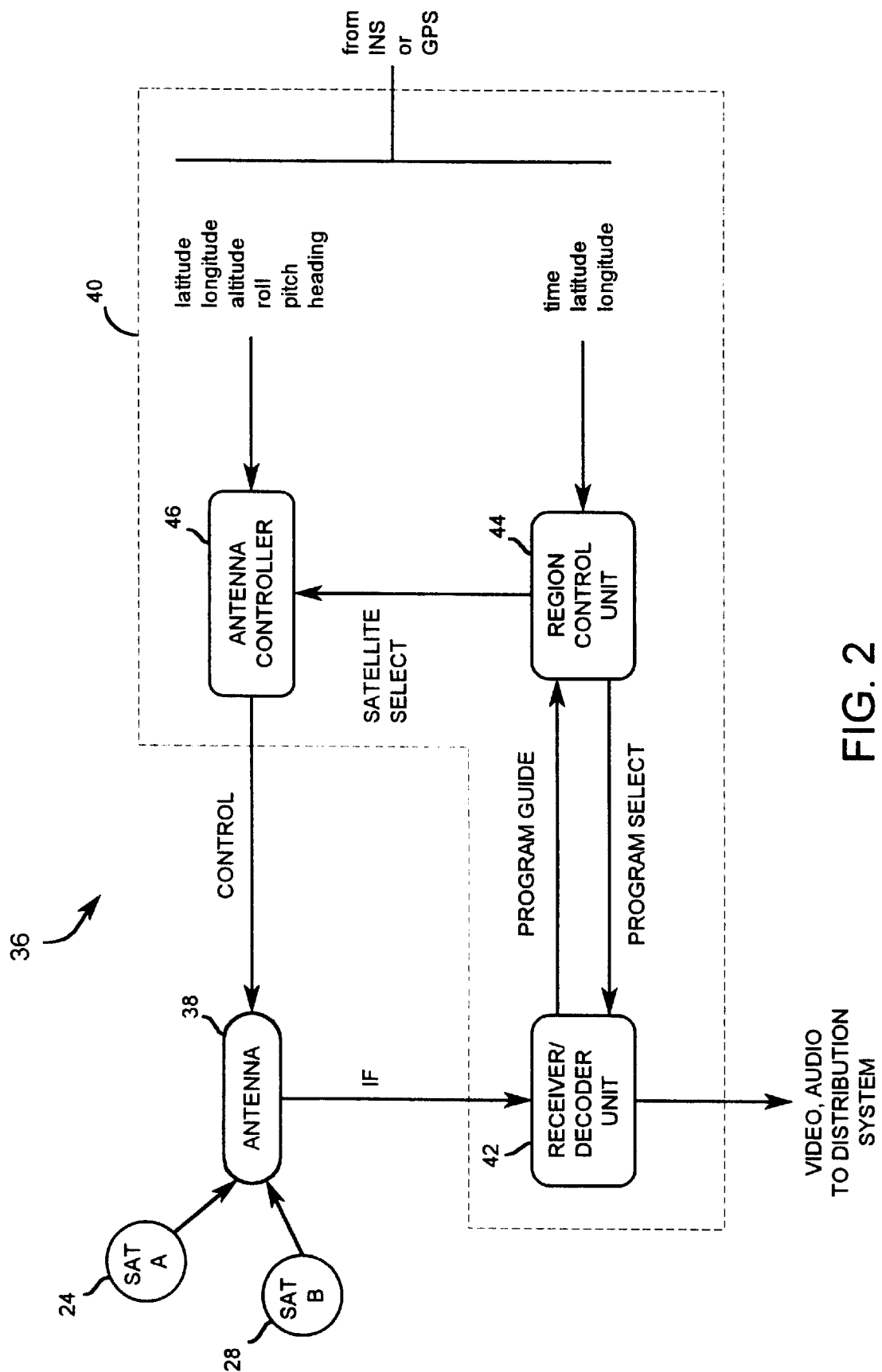
FIG. 2 is a diagram of a portion of the headend area of the system shown in FIG. 1. The headend incorporates a receiver station embodying the present invention.
Figure 3:
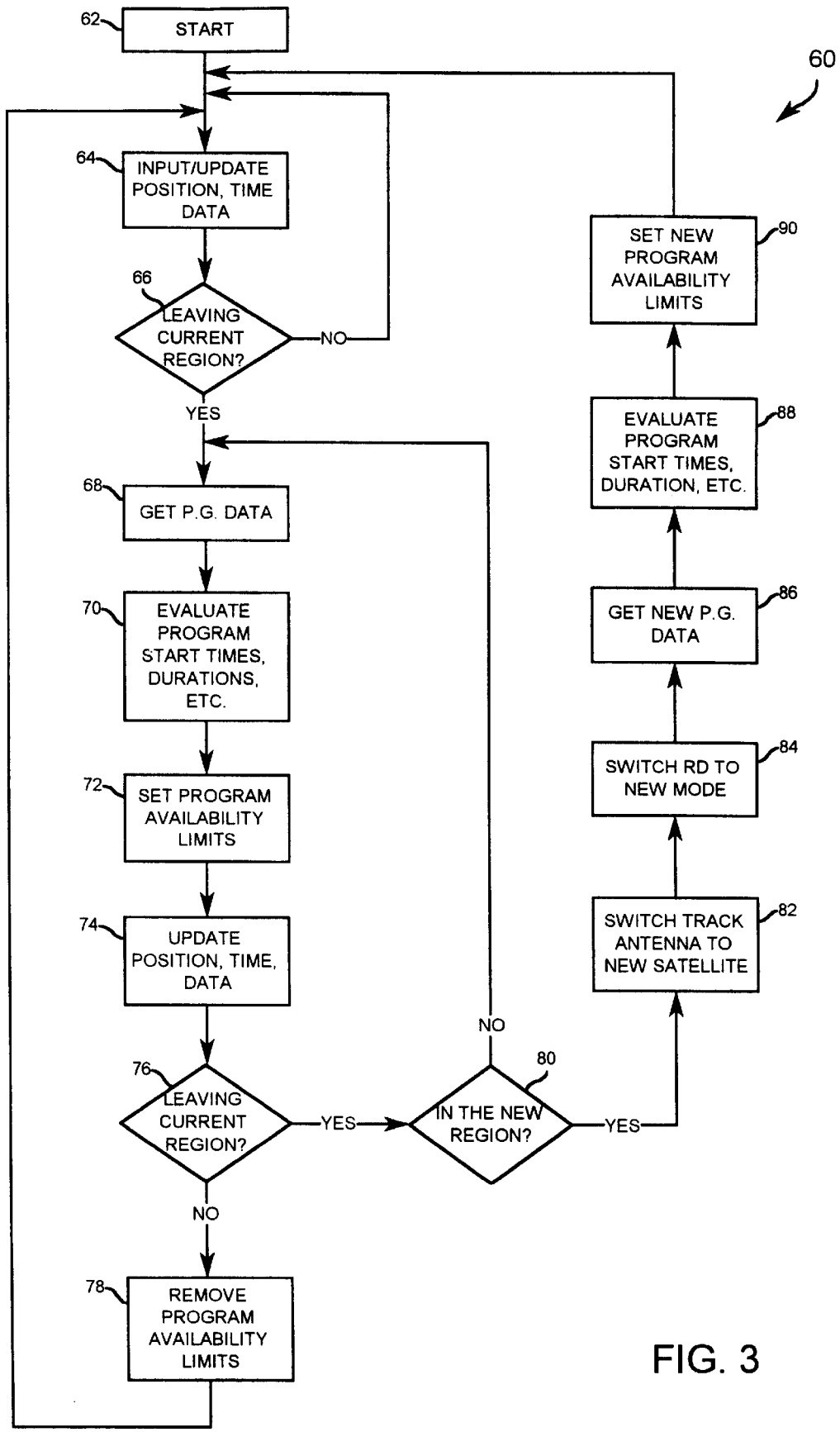
FIG. 3 is a flow diagram illustrating some of the operations performed by the receiver station shown in FIG. 2.

Turning now to the figures, and to a more detailed description of the invention, FIG. 1 is a diagram of a direct broadcast satellite transmission and reception system 10 capable utilizing the present invention; FIG. 2 is a more detailed diagram of a portion of the headend area of the system 10 shown in FIG. 1, wherein the headend incorporates a signal switch/receiver/decoder (SRD) system 40 embodying the present invention; and FIG. 3 is a flow diagram illustrating some of the operations performed by the SRD system 40 shown in FIG. 2.

As shown in FIG. 1, a direct broadcast transmission and reception system 10 includes a first transmission station 12 transmitting signals of a first direct broadcast system, a second transmission station 18 transmitting signals of a second direct broadcast system, a first satellite 24 receiving the programs transmitted from the first transmission station 12, a second satellite 28 receiving the programs transmitted from the second transmission station 18, and a moving receiver station 36 located on an aircraft 34 capable of receiving delectively programming signals from either the first satellite 24 or the second satellite 28. The receiver station 36 is preferably incorporated into an in-flight aircraft entertainment system 50 on-board the aircraft 34.

As shown in FIG. 1, the first transmission station 12 includes a first uplink antenna 1 6 and a first signal source 14, and the second transmission station 18 includes a second uplink antenna 22 and a second signal source 20. The following description, although referencing the first transmission station 12, applies equally to the second transmission station 18. The first signal source 14 is a simplified graphical representation of a variety of conventional signal processing operations that occur at the first transmission station 12. In general, the first signal source 14 includes a source of programming, a video/audio/data encoding system and an uplink frequency converter. In operation, the first transmission station 12 can receive programming from a number of sources, including satellites, terrestrial fiber optics, cable, or tape. The received programming signals, along with data signals such as electronic scheduling data (also known as "program guide" data) and conditional access data, are sent to the video/audio data encoding system where they are digitally encoded into a packetized data stream using a number of conventional algorithms, including convolutional error correction and compression. In a conventional manner, the encoded data stream is modulated and sent through the uplink frequency converter which converts the modulated encoded data stream to a frequency band suitable for reception by the first satellite 24. Preferably, the first satellite's frequency is Ku-band. The modulated, encoded data stream is then routed from the uplink frequency converter to the first uplink satellite antenna/dish 16 where it is broadcast toward the first satellite 24 over the airlink. The first satellite 24 receives the modulated, encoded Ku-band data stream and red broadcasts it downward toward an area on earth that can include the various moving receiver stations 36 which are attached to and move with an aircraft 34 during flight.

Still referring to FIG. 1, the receiver station 36 includes at least a tracking antenna 38 coupled to a switching/receiver/decoder (SRD) 40 which is coupled to and incorporated with the in-flight entertainment (IFE) system 50 of the aircraft 34. Aircrafts typically include some form of electronic distribution system for controlling and coordinating the distribution throughout the aircraft of electronic communications such as seat lighting commands, attendant call commands, audio announcements, and audio/video entertainment signals. In many recently developed systems, data communications such as video game software or menus of the available aircraft services may also be distributed. The aircraft communication system 50 shown in FIG. 1 includes a headend area 52, a signal distribution network 54, and a plurality of peripherals 56 consisting primarily of passenger seat stations or terminals. In general, the headend 52 is located at the front of the aircraft cabin, and provides, inter alia, a central location for the assembly of the entertainment related signals/services that are transmitted to the passenger terminals 56 via the aircraft communication system 54. If the communication signals relate to entertainment services, the aircraft communication system 50 is often referred to as an in-flight entertainment (IFE) system 50. A typical headend 52 4 of an IFE system 50 includes sources for video and related audio, audio unrelated to the video, and entertainment data such as game software and/or menu data. The audio source can include audio tape players (digital and analog), compact disk (CD) players, and other similar devices. The video source can include conventional video tape players (digital and analog), conventional video disk players, and other similar devices. The data source can be a conventional hard or floppy disk storage medium and a conventional computer. According to the present invention, the headend 52 incorporates, in addition to the traditional on-board audio, video and data entertainment sources, the moving receiver station 36 which includes the "tracking" satellite antenna 38 and an SRD system 40 embodying the present invention.

FIG. 2 is a diagram illustrating more details of the receiver station 36 embodying the present invention. In particular, FIG. 2 illustrates additional details of the SRD system 40 of FIG. 1. The receiver station 36 includes the tracking antenna 38 coupled to the SRD system 40. Typically, such antennas include a low noise block (LNB) which filters and shifts the incoming signal to an intermediate frequency band, such as L-band, which is between approximately 1.0 GHz and approximately 2.0 GHz. The DSS® system, in particular, shifts the signal received from the satellite to the frequency band between approximately 950 MHz and approximately 1450 MHz.

In general, the SRD system 40 includes an antenna controller 46, a receiver/decoder (RD) unit 42, and a region control unit 44. A source of position information, for example an inertial navigation system (INS) or a global position system (GPS) antenna/receiver, may be incorporated within the SRD system 40 or provided separately. The RD unit 42 is coupled to the tracking antenna 38, the aircraft communications distribution network 50, and the region control unit 44. The antenna controller 46 is coupled to the region control unit 44 and the INS/GPS system. The region control unit 44 is coupled to the RD unit 42, the antenna controller 46 and the INS/GPS system. Preferably, the antenna controller 46 and region control unit 44 are programmable microprocessor-type control devices that may be implemented separately or incorporated in a single controller.

In operation, the antenna controller 46 continuously adjusts the pointing direction of the tracking antenna 38 so that it always points in the direction of a target satellite even though the antenna 38 is in motion due to the flight of the aircraft 34 to which the antenna 38 is attached. The tracking antenna 38 is commanded by the antenna controller 46 to point to a particular set of coordinates in space that represent the location of the desired satellite, 24 or 28. These coordinates are preferably expressed in terms of azimuth and elevation relative to the aircraft's position and attitude in space, "pedestal azimuth" and "pedestal elevation". A rotation parameter may also be needed, depending upon the signal characteristics of the satellite system in use. The location and attitude of the aircraft 34 are provided by either the aircraft's INS system or a GPS antenna and receiver and are expressed in terms of aircraft longitude, latitude and altitude as well as roll, pitch and heading.

The output from the tracking antenna 38 is provided to the receiver/decoder (RD) unit 42. The RD unit 42 may be provided with the flexibility to allow it to receive and process direct broadcast television signals originating from different program providers and therefore having different formats and signal processing protocols and requirements.

One way of accomplishing this is to provide the RD unit 42 with multi-processing capabilities compatible with the signal formats of more than one program provider. Such compatibility may be achieved by two signal processing paths, or by one signal processing path preprogrammed to recognize and process the frequencies, polarizations, signal formats and other characteristics associated with the broadcast signals of several different programming providers. Under control of the region control unit 44 as described later in this disclosure, the RD unit 42 may be selectively switched from a mode in which it receives signals according to one program provider's format to a mode in which it receives signals according to another program provider's format.

The method by which the RD unit 42 and the IFE signal distribution system 50 cooperate to distribute received television signals to passenger terminals 56 can take a variety of forms. For digital direct broadcast signals, the RD unit 42 could tune to a particular transponder frequency, demodulate, decompress, error correct, and D/A convert the received television signal, and provide it to a plurality of monitors located in the aircraft cabin for viewing by all passengers. Such an arrangement would be beneficial if the received broadcast is a pay-per-view movie of the type that is typically broadcast by direct satellite program providers such as DIRECTV. Alternatively, the RD unit 42 could process the IF signal to provide encoded video and audio signals comprising a plurality of television channels, then distribute the signals to each passenger terminal 56. The passenger terminals 56 are equipped with demodulating and decoding circuitry to allow demodulation, decoding, error correction and D/A conversion at each terminal for the television channel of interest, thereby allowing each passenger to view channels independently of the channels chosen at other passenger terminals. Another approach would be to convert several television programs to analog at the RD unit 42, then distribute these analog signals to each passenger seat terminal 56, such that each passenger terminal 56 does not have to duplicate the demodulating, decoding, error correcting and D/A conversion performed by the RD unit 42. Additional details of how the antenna signals may be processed and distributed to passengers are disclosed in the previously-mentioned co-pending patent applications, including application Ser. No. 08/667,222 filed Jun. 19, 1996, entitled "Airborne Satellite Television System"; application Ser. No. 08/667,225, filed Jun. 19, 1996, entitled "Distribution Of A Large Number Of Live Television Programs To Individual Passengers In An Aircraft"; and application Ser. No. 08/667,224, filed Jun. 19, 1996, entitled "Distribution Of Satellite Television Programs To Passengers In An Aircraft When It Is Out Of Range Of The Satellites".

According to the present invention, the antenna controller 46 incorporates means for selectively switching the tracking antenna from tracking the first satellite 24 to tracking the second satellite 28 (and vice versa), thereby switching the receiver station 36 from receiving its signals from the program provider associated with the first satellite 24 to the program provider associated with the second satellite 28. The antenna controller 46 is switched under control of the region control unit 44. The region control unit 44 is preferably pre-programmed with information about the various features of various direct broadcast satellite systems, including coverage area, signal strength, etc. The region control unit 44 uses this information, along with other information such as information about which satellite, 24 or 28, the tracking antenna 38 and antenna controller 46 are currently tracking, the aircraft's longitude and latitude data, and time of day information, to determine if the aircraft 34 is about to leave the geographic region served by one satellite system and enter a region served by another. The region control unit 44 sends a "select satellite" control signal to the antenna controller 46 when it determines that the aircraft 34 is about to leave the coverage area 26 of the first satellite 24 and enter the coverage area 30 of a second satellite 28. The control signal from the region control unit 44 instructs the antenna controller 46 to switch the tracking antenna 38 from tracking the first satellite 24 to tracking the second satellite 28, or vice versa.

The region control unit 44 further incorporates means for selectively controlling the timing of when the "select satellite" control signal is sent to the antenna controller 46. A conventional digital satellite television broadcast can include program guide data that is used by the individual receiver stations to build an on screen program guide. The program guide includes a variety of information about the broadcast programming, including program titles, channels, time and length of broadcast, program ratings, program descriptions, category identifiers, and other information. The RD unit 42, which receives the IF signal from the tracking antenna 38 containing the particular television programs (channels) to be converted to a format usable by the aircraft's video and audio distribution system and made available to the passengers, also receives program guide data consisting of a list of programs available to be selected at any given time. In addition to forwarding the program guide data to the IFE signal distribution system 50, the RD unit 42 provides program guide data to the region control unit 44.

When the region control unit 44 determines that the aircraft 34 is soon going to leave the coverage area 26 of the first satellite 24, it uses the program guide data to determine if the next program scheduled to be shown on each of the available channels will be able to complete before the aircraft 34 leaves the current coverage area 26. If not, the region control unit 44 instructs the receiver/decoder (RD) unit 42 to switch to a shorter program or to a program which can be interrupted without disturbing the passengers who might be viewing that channel. An example of this type of interruptable program includes a news program. For the programs that will not have time to finish, the RD unit 42 switches to a shorter program that will have time to finish, or to a program that can be interrupted (for e.g., a news program) without disturbing the passengers who might be viewing that channel.

When the aircraft 34 leaves the coverage area 26 of the first satellite 24 and enters the coverage area 30 of the second satellite 28, the region control unit 44 and antenna controller 46 switch the tracking antenna 38 to track the second satellite 28, then determines, based on new program guide data available from the second satellite 28 via the second direct broadcast system, whether each of the programs available from the second satellite 28 are in progress or are about to start. If a program is in progress, the region control unit 44 switches the RD unit 42 to another program that can be started in progress, such as a news program. When the next program planned to be made available is due to begin, the region control unit 44 commands the RD unit 42 to switch to that program such that the passengers selecting that program will be able to view it from its start.

FIG. 3 is a flow diagram illustrating at 60 a method embodying the present invention. The illustrated method 60 represents some of the important operations that can be carried out by the SRD system 40 shown in FIGS. 1 and 2. As shown in FIG. 3, the process starts at block 62, then inputs/updates the positional, time and other related data at block 64. The inquiry is then made at block 66 as to whether the aircraft 34 is within a range of a boundary of the currently occupied coverage area (26 or 30). If the answer to the inquiry at block 66 is no, the process returns to block 64 and inputs/updates the positional, time and other related data. If the answer to the inquiry at block 66 is yes, the process moves to block 68 where the program data is retrieved. From block 68, the process moves to block 70 where each program is evaluated based on the program guide data, the positional data (including speed and direction of flight data) and time data. More particularly, block 70 determines for each available program whether it will finish before the aircraft 34 leaves the current coverage area. From block 70, the process moves to block 72 where certain limitations are placed on program availability based on the evaluation made in block 70. In particular, programs that will not be able to finish before the aircraft 34 leaves the coverage area (26 or 30) are made unavailable. This may be accomplished by sending a signal to the passenger seat terminals 56 preventing them from accessing that programming channel. If a passenger is not currently viewing the subject program, but attempts to view it after it has been labeled unavailable, the passenger's seat terminal 56 is prevented from displaying that program. The terminal 56 may instead be programmed to generate a graphic overlay message explaining to the passenger why that program is no longer available, and suggesting that the passenger try another channel. Such an overlay may state "Because Your Aircraft Will Be Leaving The Coverage Area Of DIRECTV-USA Within The Next 15 Minutes, 'Butch Cassidy & The Sundance Kid' Is Not Currently Available. Please Select Another Program". If a passenger is currently viewing the subject program at the time it is identified as unavailable, the passenger's seat terminal 56 is prevented from continuing to display that program. Prior to discontinuing access to that program, the terminal 56 may be programmed to generate a graphic overlay message explaining to the passenger why that program is no longer being made available, and suggesting that the passenger try another channel. Such an overlay may state "Because Your Aircraft Will Be Leaving The Coverage Area Of DIRECTV-USA Within The Next 15 Minutes, 'Butch Cassidy & The Sundance Kid' Will No Longer Be Available For Viewing. Please Select Another Program". The programs that remain available to the terminal 56 include programs that have been identified as having time to complete before the aircraft 34 leaves the current coverage area (26 or 30), or to programs such as news programs which may be interrupted without upsetting a passenger viewing that program. Alternatively, the terminal 56 could be programmed to automatically switch to a program that has been identified as having time to complete, or to a program such as a news program which may be interrupted without upsetting a passenger viewing that program.

Returning to the flow diagram of FIG. 3, the process 60 inputs/updates the positional, time and other related data at block 74. The inquiry is again made at block 76 as to whether the aircraft 34 is within a range of a boundary of the currently occupied coverage area (26 or 30). If the answer to the inquiry at block 76 is no, the process removes the program availability restrictions at block 78 and returns to block 64. If the answer to the inquiry at block 76 is yes, the process moves to block 80 where the inquiry is made as to whether the aircraft 34 has actually left the coverage area (26 or 30). If the answer to the inquiry at block 80 is no, the process returns to block 68. If the answer to the inquiry at block 80 is yes, the process moves to block 82 where it switches the tracking antenna controls so that the antenna 38 now tracks the satellite (24 or 28) associated with the new coverage area (26 or 30). From block 82, the process moves to block 84 where it switches the receiver/decoder unit 42 so that it can now receive/process signals according to the format and protocol associated with the new signal source and new coverage area. From block 84, the process moves to block 86 where it retrieves the new program guide information associated with the new signal source and new coverage area. From block 86, the process moves to block 88 where each program of the new coverage area is evaluated based on the program guide data, the positional data (including speed and direction of flight data) and time data. More particularly, block 88 determines for each available program in the new coverage area whether it is in progress or yet to start. From block 88, the process moves to block 90 where certain limitations are placed on program availability based on the evaluation made in block 88. In particular, programs are made unavailable to passenger terminals if they are in progress at the time the aircraft enters the new coverage area. This may be accomplished by sending a signal to the passenger seat terminal 56 preventing it from accessing that programming channel. If a passenger is not currently viewing the subject program, but attempts to view it after it has been labeled unavailable, the passenger's seat terminal 56 is prevented from displaying that program. The terminal 56 may instead be programmed to generate a graphic overlay explaining to the passenger why that program is not available, and suggesting that the passenger try another channel. Such an overlay may state "Because Your Aircraft Just Entered The Coverage Area Of DIRECTV-Latin America, 'Butch Cassidy & The Sundance Kid' is Not Currently Available. Please Select Another Program". The programs that remain available to the terminal 56 include programs that have been identified as having not yet started, or programs such as news programs which may be viewed after their start times without upsetting a passenger viewing that program. Alternatively, the terminal 56 could be programmed to automatically switch to a program that has been identified as having not yet started, or to a program such as a news program which may be interrupted without upsetting a passenger viewing that program. From block 90, the process returns to block 64.

In an alternative to the process illustrated in FIG. 3, the SRD system 40 may be programmed to continuously evaluate the length and nature of a particular programming choice against a wide variety of parameters, including aircraft positional information, coverage area information, flight time, and others. The programming may be allowed if it is either a "interruptable" program, or a program that can be completed before the aircraft lands or leaves the current coverage area, and disallowed if it is not an "interruptable" program, and is too long to be completed before the aircraft lands or leaves the current coverage area.

In another alternative to the process illustrated in FIG. 3, the SRD system may be programmed to evaluate the length and nature of a particular programming choice against a wide variety of parameters, including aircraft positional information, time of day, coverage area information, flight time, broadcast signal strength, and others. All programming is allowed. If it is determined, based on the above-referenced evaluation, that a program can be completed before the aircraft lands or leaves the current coverage area, no special action is taken. If it is determined that a program cannot be completed before the aircraft lands or leaves the current coverage area, the SRD system 40 sends a signal to the passenger terminal 56 telling it to generate an overlay explaining to the passenger that the program they have chosen may be interrupted before the flight is completed. For example, the overlay could read "Because This Program Is Scheduled To End At 8:00 p.m., This Flight May Be Completed Before The Program Is Over". Alternatively, the overlay could read "Because This Program Is Scheduled To End At 8:00 p.m., This Flight May Leave The Coverage Area Of DIRECTV-USA Before The Program Is Over". The message could be timed to appear temporarily when the terminal selects the channel, and periodically thereafter. For example, a similar message may be timed to appear 5 minutes before the aircraft leaves one coverage area for another. Such a message could read "This Flight Is Leaving The Coverage Area Of DIRECTV-USA. The Program You Are Viewing Will Be Unavailable In 5 Minutes."

Of course, it should be understood that a range of changes and modifications can be made to the preferred embodiment described above. For example, the present invention is described in connection with a particular hardware and processing structure for transmitting and receiving digital broadcast transmissions and related data. However, a wide variety of transmitting and receiving structures could be utilized as long as the essential control features described herein are present. For example, the receive antennae could be larger than 18 inches to improve link margin and limit any fade outs during bad weather. The digital transmission format could be digital cable, LMDS, MMDS, or other similar formats. The satellite transmitters could be at medium-earth-orbit (MEO) or low-earth-orbit (LEO). The satellite could be in geosynchronous orbits which travel at the same relative rate of speed as the earth's rotation, but allows some movement in latitude. The satellite coverage areas could be anywhere in the world. The coverage areas could be completely separate or they could overlap. The video signals provided to the passenger terminal display could take a variety of forms depending on the form of display. A plasma or LCD display could receive the video in a digital format. The display could also receive video in a PAL or SECAM format. It is therefore intended that the foregoing detailed description be regarded as illustrative rather than limiting and that it be understood that it is the following claims, including all equivalents, which are intended to define the scope of this invention.

What is claimed is:

1. A system for controlling the reception of broadcast entertainment transmissions at a moving receiver station, comprising:
    a tracking antenna for receiving broadcast entertainment transmissions from a first transmitter having a first coverage area and from a second transmitter having a second, different coverage area;
    an antenna controller coupled to said tracking antenna for pointing said tracking antenna toward at least a first set of predetermined coordinates corresponding to the location of said first transmitter and a second set of predetermined coordinates corresponding to the location of said second transmitter and causing said tracking antenna to track said first set of predetermined coordinates or said second set of predetermined coordinates;
    a region controller coupled to said antenna controller and receiving position information related to the location of said moving receiver station, said region controller storing coverage area data associated with at least said first and second coverage areas;
    said region controller sending a first control signal corresponding to said first set of predetermined coordinates to said antenna controller when said position information and said coverage area data indicates that said moving receiver is within said first coverage area for causing said antenna to track said first transmitter; and
    said region controller sending a second control signal corresponding to said second set of predetermined coordinates to said antenna controller when said position information and said coverage area data indicates that said moving receiver is within said second coverage area for causing said antenna to track said second transmitter.

2. The system of claim 1 wherein:
    said tracking antenna forwards received broadcast entertainment transmissions to a signal processing unit for processing said broadcast entertainment transmissions;
    said broadcast entertainment transmissions including program attribute data;
    said region controller coupled to said signal processing unit, receiving said program attribute data and using said position information, said coverage area data and said program attribute data to determine what portions of said broadcast entertainment transmissions are available from said signal processing unit.

3. The system of claim 2 wherein said program attributes include start times and lengths of programs included among said broadcast entertainment transmissions.

4. The system of claim 3 wherein said region controller uses said position information and said program attribute data to determine:
    how long said moving receiver will take to travel from said first coverage area to said second coverage area;
    what programs will end before said moving receiver leaves said first coverage area; and
    what programs will not end before said moving receiver leaves said first coverage area.

5. The system of claim 4 wherein:
    said signal processing unit is coupled to a signal distribution system that transmits said broadcast entertainment transmissions to remote display terminals coupled to said signal distribution system; and
    said region controller causing the display coupled to said signal processing unit to display overlay messages related to said programs that will end before said moving receiver leaves said first coverage area, and related to said programs that will not end before said moving receiver leaves said first coverage area.

6. The system of claim 1 wherein:
    said first transmitter comprises a geostationary satellite; and
    said broadcast entertainment transmissions comprise digital video, audio and data signals.

7. The system of claim 1 wherein said positional information comprises time, latitude and longitude.

8. The system of claim 7 wherein at least some of said positional information is provided by a global positioning system.

9. The system of claim 7 wherein at least some of said positional information is provided by an inertial navigational system.

10. The system of claim 1 wherein said moving receiver station is coupled to an aircraft.

11. The system of claim 10 wherein said aircraft is in flight.

12. The system of claim 1 wherein said moving antenna is coupled to an aircraft which is in flight and wherein:

said broadcast entertainment transmissions are provided to passengers of said aircraft in an in-flight entertainment system which includes a receiver/decoder unit, and said region controller is coupled to said receiver/decoder unit to provide overlay messages to display units of said in-flight entertainment system and to control distribution of received broadcast entertainment transmissions in accordance with program attribute data.

13. A method of receiving broadcast entertainment transmissions on-board a moving aircraft, comprising:

receiving position information about a location of said aircraft;

receiving first program attribute data related to programs broadcast as part of said broadcast entertainment transmissions;

using said position information to determine whether said aircraft is within a range of leaving a first coverage area associated with a first geostationary satellite broadcasting first entertainment transmissions from a first program provider;

using said position information, said program attribute information and said determination of whether said aircraft is within a range of leaving said first coverage area to limit the availability of said first broadcast entertainment transmissions.

14. The method of claim 13 wherein said program attributes include start times and lengths of programs included among said broadcast entertainment transmissions.

15. The method of claim 14 further comprising the steps of using said position information and said program attribute data to determine:

how long said aircraft will take to travel from said first coverage area to a second coverage area;

what programs will end before said moving aircraft leaves said first coverage area; and what programs will not end before said moving aircraft leaves said first coverage area.

16. The method of claim 15 further comprising the steps of:

providing said broadcast entertainment transmissions to remote display terminals; and causing the display to display overlay messages related to said programs that will end before said moving aircraft leaves said first coverage area, and related to said programs that will not end before said moving aircraft leaves said first coverage area.

17. The method of claim 13 said positional information comprises time, latitude and longitude.

18. The method of claim 1 wherein at least some of said positional information is provided by a global positioning system.

19. The method of claim 17 wherein at least some of said positional information is provided by an inertial navigational system.

* * * * *